United States Patent [19]
Rais et al.

[11] Patent Number: 4,475,009
[45] Date of Patent: Oct. 2, 1984

[54] METHOD AND DEVICE FOR REMOTELY CONTROLLING TELEPHONE CALL FORWARDING

[76] Inventors: Elliot Rais, 60 Sutton Pl. S., (Suite 9HS), New York, N.Y. 10022; Dan Fogel, 301 E. 73 St., (Suite 12 B), New York, N.Y. 10021

[21] Appl. No.: 442,814

[22] Filed: Nov. 18, 1982

[51] Int. Cl.³ .............................................. H04M 3/54
[52] U.S. Cl. ................. 179/2 A; 179/18 BE; 179/90 BD
[58] Field of Search ............ 179/2 A, 5.5, 6.07, 179/6.16, 6.17, 18 BE, 90 BD

[56] References Cited
U.S. PATENT DOCUMENTS 3,925,622 12/1975 Robinson ...................... 179/18 BE
3,959,600  5/1976 Sousa ........................... 179/18 BE
4,413,158 11/1983 Danford ...................... 179/18 BE X

FOREIGN PATENT DOCUMENTS 7604000 10/1977 Netherlands .................. 179/18 BE Primary Examiner—Keith E. George
Attorney, Agent, or Firm—Sprung Horn Kramer & Woods

[57] ABSTRACT

A system for remotely controlling call forwarding for a given telephone line, comprises detecting the receipt of a remotely transmitted identification code to the given telephone line, storing a desired call forwarding telephone number remotely transmitted after the identification code, and seizing the given telephone line and applying a call forwarding initiate code thereto followed by the stored telephone number. The receipt of a remotely initiated signal is detected at the given telephone line and the given line is seized upon a favorable detection and a call forwarding terminate code is applied.

27 Claims, 13 Drawing Figures

DIALER AND ACKNOWLEDGEMENT TONES (P)ROM PROGRAMMING

| DIGIT | A8 | A7 | A6 | A5 | A4 | A3 | A2 | A1 | D8 | D7 | D6 | D5 | D4 | D3 | D2 | D1 |
|---|---|---|---|---|---|---|---|---|---|---|---|---|---|---|---|---|
| 1 | 0 | 0 | 0 | 0 | 0 | 0 | 0 | 1 | 1 | 1 | 1 | 0 | 1 | 1 | 1 | 0 |
| 2 | 0 | 0 | 0 | 0 | 0 | 0 | 1 | 0 | 1 | 1 | 1 | 0 | 1 | 1 | 0 | 1 |
| 3 | 0 | 0 | 0 | 0 | 0 | 0 | 1 | 1 | 1 | 1 | 1 | 0 | 1 | 0 | 1 | 1 |
| 4 | 0 | 0 | 0 | 0 | 0 | 1 | 0 | 0 | 1 | 1 | 0 | 1 | 1 | 1 | 1 | 0 |
| 5 | 0 | 0 | 0 | 0 | 0 | 1 | 0 | 1 | 1 | 1 | 0 | 1 | 1 | 1 | 0 | 1 |
| 6 | 0 | 0 | 0 | 0 | 0 | 1 | 1 | 0 | 1 | 1 | 0 | 1 | 1 | 0 | 1 | 1 |
| 7 | 0 | 0 | 0 | 0 | 0 | 1 | 1 | 1 | 1 | 0 | 1 | 1 | 1 | 1 | 1 | 0 |
| 8 | 0 | 0 | 0 | 0 | 1 | 0 | 0 | 0 | 1 | 0 | 1 | 1 | 1 | 1 | 0 | 1 |
| 9 | 0 | 0 | 0 | 0 | 1 | 0 | 0 | 1 | 1 | 0 | 1 | 1 | 1 | 0 | 1 | 1 |
| 0 | 0 | 0 | 0 | 0 | 1 | 0 | 1 | 0 | 0 | 1 | 1 | 1 | 1 | 1 | 0 | 1 |
| Single Tone | 0 | 0 | 0 | 1 | 0 | 0 | 0 | 0 | 1 | 1 | 0 | 0 | 0 | 1 | 1 | 1 |
| " " | 0 | 0 | 1 | 1 | 0 | 0 | 0 | 0 | 1 | 1 | 0 | 0 | 0 | 1 | 1 | 1 |
| " " | 0 | 1 | 1 | 1 | 0 | 0 | 0 | 0 | 1 | 1 | 0 | 0 | 0 | 1 | 1 | 1 |
| " " | 1 | 0 | 1 | 1 | 0 | 0 | 0 | 0 | 1 | 1 | 0 | 0 | 0 | 1 | 1 | 1 |
| " " | 1 | 1 | 1 | 1 | 0 | 0 | 0 | 0 | 1 | 1 | 0 | 0 | 0 | 1 | 1 | 1 |

All addresses not specifically described above will be programmed as: 1111 1111

TIMING CIRCUIT

METHOD AND DEVICE FOR REMOTELY CONTROLLING TELEPHONE CALL FORWARDING

BACKGROUND OF THE INVENTION

The present invention relates to a method and a device for remotely controlling call forwarding for a given telephone line.

Call forwarding now exists as a standard optional service for telephone users. At the present time, call forwarding is initiated and terminated only from the telephone instrument connected to the telephone line having such service.

For example, in New York State, in order to initiate call forwarding one must dial a call forwarding initiate code 72 at the telephone instrument and wait for a dial tone approximately five seconds later. Then the user dials in the call forwarding telephone number and waits for two beeps in response thereto followed by the ringing of the forwarding number. If the telephone at the call forwarding number is then picked up, the call forwarding function is initiated. If on the other hand the call forwarding number is busy or no one picks up, then the user must hang up his local phone, dial 72 again and wait for a dial tone, dial in the call forwarding telephone number again and wait for the two beeps which will then be followed by a dial tone, indicating that the call forwarding function has been initiated.

In order to terminate call forwarding, one must dial a call forwarding terminate code 73 from the local telephone and wait for two beeps followed by a dial tone. This indicates that the call forwarding function has been terminated.

While call forwarding is a useful option for a telephone user, it has the disadvantage of requiring the initiation and termination thereof to take place at the given local telephone instrument. Thus if the telephone user desires to be at different locations during a given period without returning to his local base, it is impossible to initiate or terminate the call forwarding or to change it to a new or different number.

SUMMARY OF THE INVENTION

The main object of the present invention is to provide a method and device for enabling a user to have his calls follow him from place to place by remotely controlling the call forwarding at a given telephone line.

Another object of the present invention is to provide for the remote loading of telephone numbers using DTMF or other signal transmission.

A further object of the present invention is to enable call forwarding in accordance with the telephone company procedure, while eliminating the disadvantages and inconveniences of the telephone company procedure.

A still further object of the present invention is to terminate call forwarding remotely in accordance with the telephone company procedure, by establishing a telephone ring count per timed interval detection or by way of a preselected call forwarding time interval.

Another object of the present invention is to use the device for remotely controlling call forwarding in combination with a telephone answering machine and for interfacing with same either as a built-in part of the answering machine or as an external add-on unit.

These and other objects and advantages of the present invention are achieved in accordance with the present invention by a method and a device for remotely controlling call forwarding for a given telephone line comprising means responsive to the receipt of a preselected identification code by input means connected to a given telephone line for storing a desired call forwarding telephone number received after the identification code and for sequentially applying a call forwarding initiate code and the stored number to output means connected to the given telephone line to thereby initiate call forwarding by remote control.

In a preferred embodiment of the present invention, the call forwarding is initiated by sequentially applying the call forwarding initiate code and thereafter the stored number and terminating the call prior to the ringing of the telephone to be call forwarded to and thereafter immediately repeating the sequential operation of the call forwarding initiate code and stored number. This advantageously reduces the number of operations that have to be performed by the person who is carrying out the remote control.

The device and method according to the present invention also includes means responsive to signals received at the input means for applying a call forwarding terminate code to the output means and thereby terminating the call forwarding function by remote control.

The terminate code may be applied after each call that is forwarded to the stored number and, if a security code is not received within a given interval thereafter, the device according to the present invention can initiate a call forwarding initiate code followed by the stored number in order to reinitiate the call forwarding. Alternatively, this sequence can be done if two calls are forwarded within a preselected short interval carried out by the user himself so as to initiate the termination of the call forwarding function. If further protection by the user is needed, the system can require the receipt at the input means of an identification code in order to prevent the reinitiation of the call forwarding by the aforementioned means.

In a further embodiment according to the present invention, the user, at the time that the call forwarding is initiated, may store a call forwarding time interval code corresponding to a desired call forwarding time interval which would cause the device to automatically terminate the call forwarding at that number after the expiration of the time interval.

The present invention would be better understood from the following detailed description taken in conjunction with the attached drawings wherein:

DETAILED DESCRIPTION OF THE PREFERRED EMBODIMENTS

Figure 1:
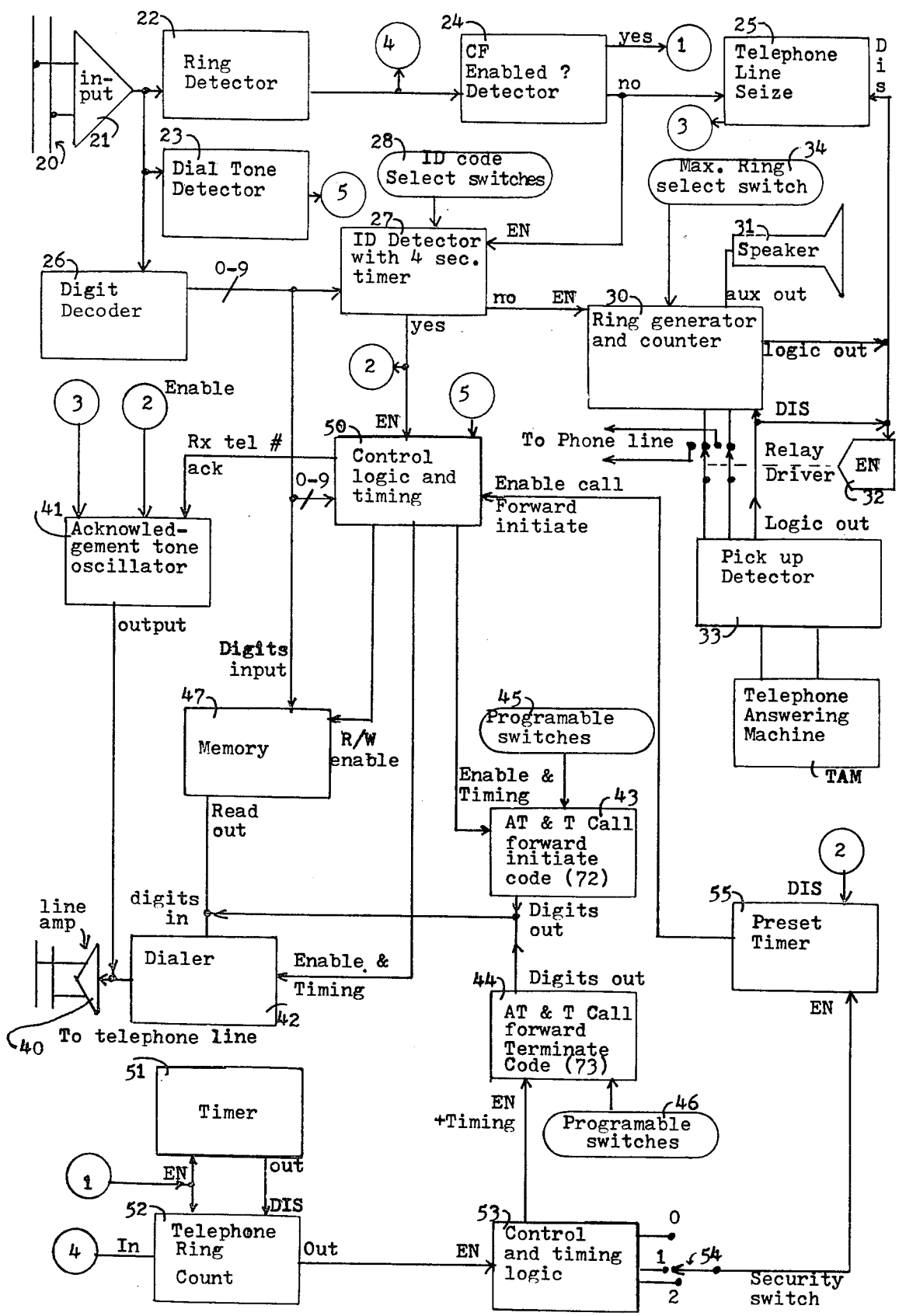
FIG. 1 is a block diagram of one embodiment of the present invention.
Figure 2:
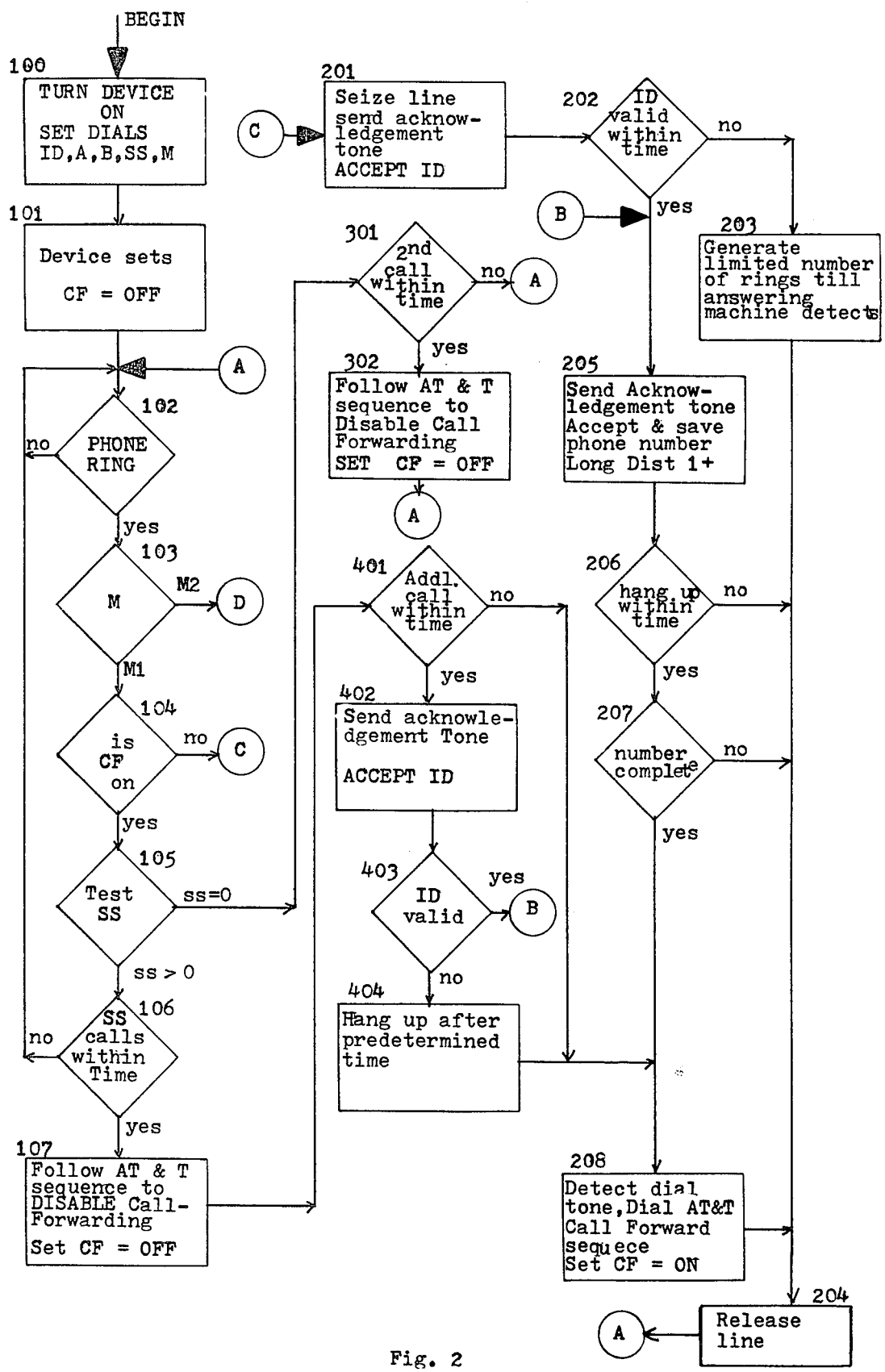
FIG. 2 is a flow chart of the operation of the block diagram of FIG. 1.

Referring now to FIGS. 1 and 2, a method and device for remotely controlling call forwarding for a given telephone line 20 is described.

Signals which are remotely transmitted along telephone line 20 are input into the device at input circuitry 21 whose output is fed to ring detector 22, dial tone detector 23 and digit decoder 26. The ring detector 22 has the output thereof connected to a detector 24 which indicates whether the call forwarding has already been initiated for the given telephone line 20. The output of the ring detector 22 is also connected to the input of a telephone ring counter 52.

The output of the call forwarding enabled detector 24 which indicates that call forwarding is enabled is fed to the count enable input of the counter 52 as well as the enabling input of a timer 51.

The output of the dial tone detector 23 is fed to control logic and timing circuitry 50 which also receives other control signals as will be described hereinafter. The digit decoder 26 has 10 output lines which feed the digits 0 through 9 to an identification detector 27, the control logic and timing circuitry 50, as well as to a random access memory 47.

The "no" output of the detector 24 indicating that the call forwarding mode is not present is also fed to the input of the telephone line seize circuitry 25 which enables the device to seize the telephone by means of the output line amplifier 40 which is connected to the given telephone line 20 and for the receipt of signals from the line 20 by the input 21.

The identification detector 27 is used to indicate whether the incoming signals on a given telephone line 20 are meant to instruct the device or whether the incoming signals are merely ordinary telephone calls. The detector 27 preferably includes a four second timer which allows the user to enter in the identification code within four seconds of the time that the ring is detected. The identification code is set by means of identification code select switches 28 whose output is fed into the detector 27 and the detector is enabled only when the device is not in the call forwarding mode as is indicated by the no output of detector 24 which is connected to the enabling input of detector 27.

The identification code detector 27 generates a signal indicating that the identification code has not been received and this is connected to the ring generator and counter 30. The ring generator and counter 30 is provided since the device is disposed between the actual telephone unit and/or the telephone answering machine TAM and the telephone line 20 and as a result if the incoming signal is merely an ordinary telephone call, then the telephone must be allowed to ring or the telephone answering machine must be allowed to operate in the usual manner. This is carried out by the ring generator and counter 30 which can be programmed by maximum ring select switch 34 to determine the maximum number of rings on the phone and which may have an auxiliary output to speaker 31 to make the rings audible in a particular manner. The output of the ring generator and counter 30 is fed to the telephone and/or telephone answering machine via the pick-up detector 33. The pick-up detector 33 acts to control the relay driver 32 upon the detection of a telephone or answering machine pick-up.

When the identification code detector 27 detects the identification code, a signal corresponding to this favorable detection is fed to the control logic and timing circuitry 50 as well as to preset timer 55 and to an acknowledgement tone oscillator 41 whose output is coupled to the input of line amp 40 and which generates a beep on the line acknowledging the fact that the identification code was received. The tone oscillator generates similar beeps when the line is seized and when the stored number is received.

The output of the preset timer 55 is fed to the control timing and logic 50 to indicate that it is now enabled to initiate call forwarding and is also fed from security switch 54 which will be explained hereinafter.

In carrying out the call forwarding initiate, the control logic and timing circuit 50 has one output connected to the read/write enable input of memory 47 allowing it to write in the digit inputs received from the output of the digit detector 26 and allowing it to read out the stored telephone number for input into the dialer 42. Another output of the control logic and timing circuit 50 is fed to the dialer 42 to enable and effect the timing of the number to be dialed onto telephone line 20 via the line amplifier 40.

The dialer 42 also receives the digit outputs from the call forward initiate code generator 43 which is programmed by programmable switches 45 to the particular call forward initiate code in the area. The call forward initiate code generator 43 is also enabled and controlled by the control logic and timing circuit 50.

The dialer 42 further receives the digit outputs from the call forward terminate code generator 44 when it is desired to terminate the call forwarding and the particular call forward terminate code is programmed therein by programmable switches 46 to the particular call forward terminate code for the area. The control and timing for the generation of the call forward terminate code generator 44 is achieved by the control and timing logic circuitry 53 which controls, via the security switch 54 and preset timer 55, the circuitry 50.

The circuitry described above is operable to carry out the method of the invention as follows in accordance with the flow chart of FIG. 2. To begin with, in step 100, the device is turned on and the programmable switches 28, 34, 45, 46 and security switch 54 are set as desired.

As a result of the initialization of the device, the detector 24 indicates that the device is not in the call forwarding mode, that is call forwarding is not enabled.

At this point, no input to the telephone line 20 causes the device to remain in state A. If the phone does ring as set forth in step 102, the device looks to see in step 103 if the device is in the mode of terminating call forwarding based on the of rings per timed interval (M1) or in the mode wherein the user enters a predetermined time interval for call forwarding after which the device terminates call forwarding (M2). This latter mode will be described hereinafter with respect to FIGS. 3 and 4.

Assuming mode M1, the device in step 104 looks to see if the call forwarding enabling detector 24 indicates that the call forwarding is on (yes) or off (no). If call forwarding is not on, as it would not be when the device is first turned on, the device branches to step 201 wherein the telephone line is seized and an acknowledgement code is sent via the telephone line seizing circuit to the acknowledgement tone oscillator to "beep" the line and the device then awaits the receipt of an identification code remotely transmitted along line 20. In step 202, the detector 27 determines whether the identification code received was valid and whether it was received in the preselected four second interval. If not, then in step 203 the ring generator 30 generates a limited number of rings until the answering machine TAM "picks up" the telephone. If not, the line is automatically released by the telephone line seize circuit 25 and the device returns to state A.

If on the other hand the identification code was valid and received in the preselected time, an acknowledgement tone is sent and the circuit awaits the receipt of the call forwarding telephone number for storage in memory 47. In step 206, if for any reason the user has not hung up the remote telephone instrument or in step 207 the user has not input a sufficiently complete telephone number to be stored, then the line is automatically released and the telephone is returned to state A. On the other hand, if everything is properly done by the user, the device proceeds to step 208 wherein a dial tone is detected by detector 23 and the control logic and timing circuitry 50 carries out the call forwarding initiate sequence. This sequence includes dialing the telephone company call forwarding access code, waiting for a dial tone, dialing the stored telephone number, detecting an acknowledgement signal, hanging up momentarily before the call forwarding telephone number rings, seizing the line again, detecting a dial tone, dialing the call forwarding initiate code, waiting for a dial tone, dialing the stored call forwarding telephone number, detecting the acknowledgement signal and hanging up. It should be noted that the above sequence effects call forwarding initiation regardless of whether the call forwarding number is busy or unanswered and does not necessitate any continued or further operations by the user.

At this point, the call forwarding enabled detector 24 indicates (by the "yes" output) that the device is in the call forwarding mode and the line is released at step 204 and the telephone returned to state A.

Now, if the telephone should ring again the device will proceed from step 104 to step 105 wherein the security switch 54 is looked at. The security switch 54 determines, as an option to the user, the mode in which the call forwarding termination will occur. When the security switch is at "0", there is no security and any two consecutive calls within a predetermined short period of time will permanently terminate call forwarding. When the switch 54 is at "1", each call temporarily terminates call forwarding, however, in the absence of an immediate additional call with a proper identification code, the call forwarding will be reinstituted to the last stored number. When the security switch is at "2", this means that any second call received within a predetermined time interval will temporarily terminate call forwarding, however the call forwarding will be reinstituted if a proper identification code has not been received within a predetermined time interval. This is carried out by the ring count counter 52, timer 51, timer 55 and control logic and timing circuitry 50 and 53.

If the security switch is at "0", then if the counter 52 detects a second call at step 301 within a predetermined time interval set by timer 51, then the control logic 53 is enabled to effect the generation of the call forward terminate code by generator 44 which is then placed on the line by means of dialer 42. The call forward enabled detector 24 is then switched to the call forwarding off state in step 302 and the device is returned to state A. On the other hand, if the second call is not received within the time interval set by timer 51, then this means that it was just a normally received call to be call forwarded and the device is returned to state A.

If the security switch is set to either "1" or "2", the device first looks in step 106 to see if a second call (for security switch set at "2") is received within the time set forth by timer 51. If not, then the device is returned to state A. If it is, then the device advances to step 107 wherein the control and timing logic circuitry 53 effects the temporary termination of the call forwarding and the call forwarding enabling detector 24 indicates that the call forwarding is off. The device then waits at step 401 to see if another call is received within the time set by timer 55 and if not, the device is advanced to step 208 wherein call forwarding is reinitiated. If the additional call is received at step 401, an acknowledgment tone is sent to line 20 and the device awaits to see if a valid identification code is received at step 403. If not, in step 404 the line is hung up and the device is advanced to step 208 wherein the call forwarding initiate sequence is initiated. If the identification code is valid, the device returns to the sequence of steps beginning with 205 to enable the user to either enter in a new call forwarding number or merely allow the device to be in the call forwarding off mode, that is, call forwarding is terminated.

Figure 3:
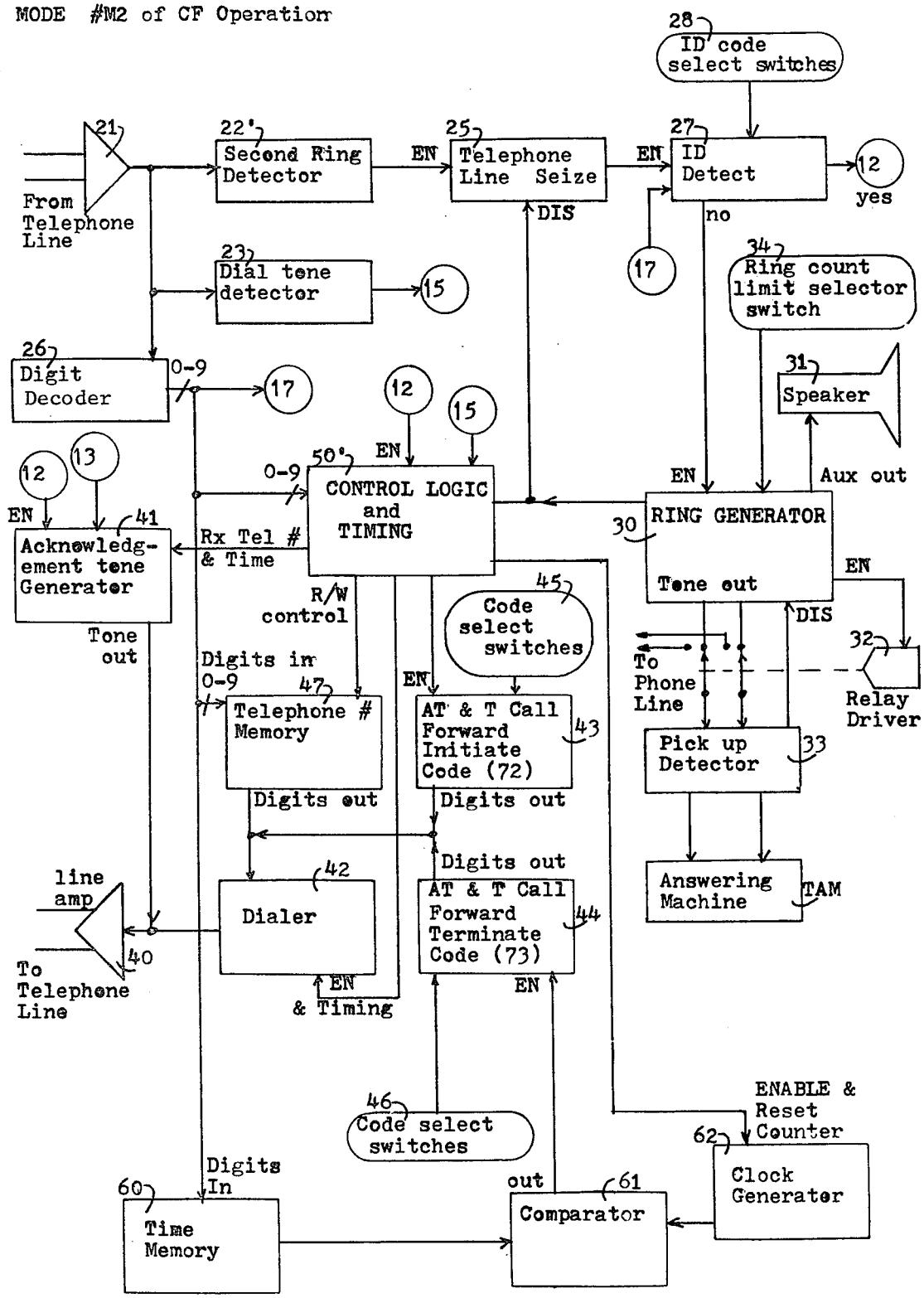
FIG. 3 is a block diagram of another embodiment of the present invention.
Figure 4:
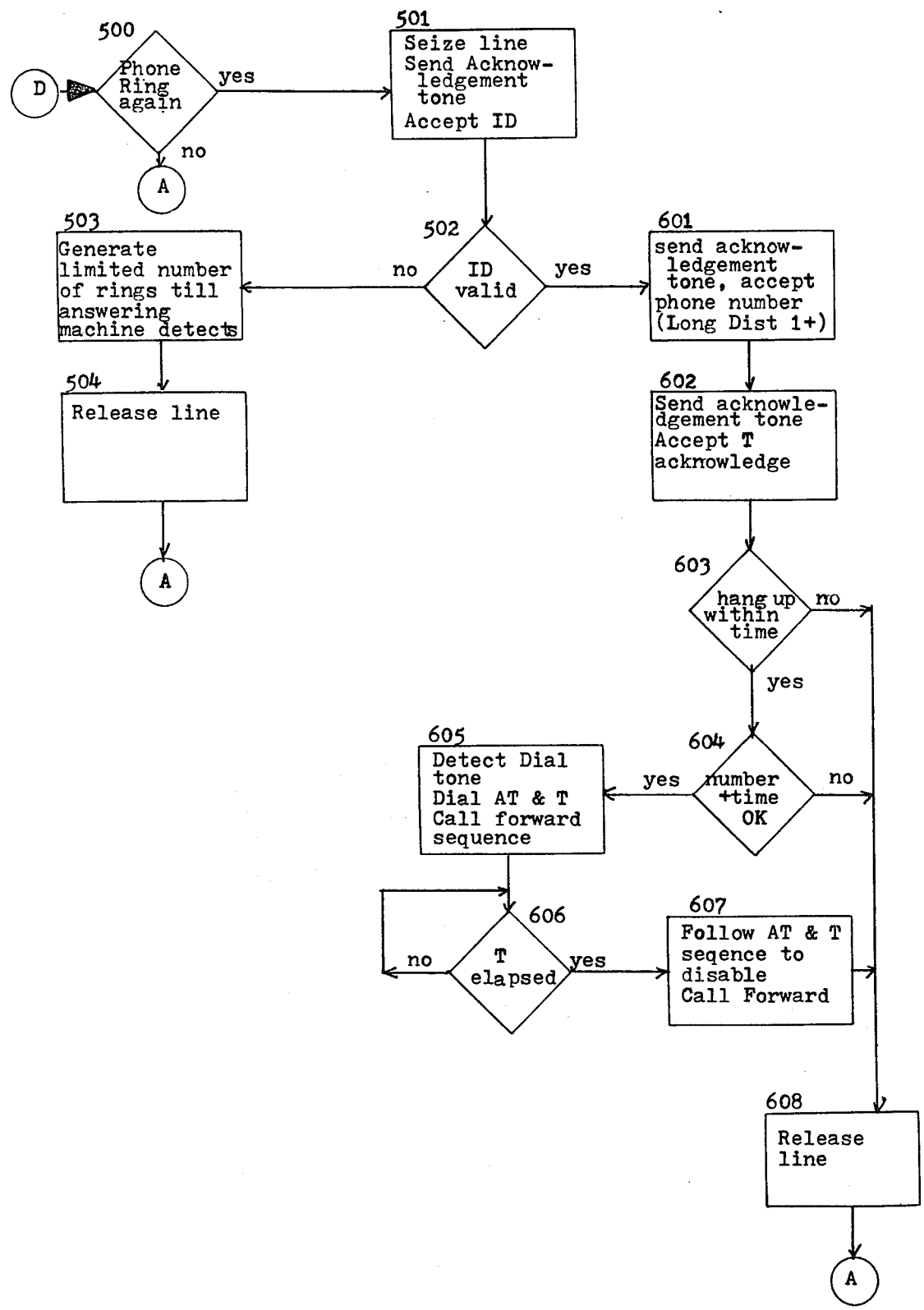
FIG. 4 is a flow chart of the operation of the embodiment of FIG. 3.

FIGS. 3-4 refer to an alternative embodiment of the invention wherein much of the circuitry of FIG. 1 is used, however call forwarding is terminated by a call forwarding time interval code corresponding to a desired call forwarding time interval which is stored in the device at the time that the call forwarding telephone number is stored and after the receipt of a valid identification code by the device. With respect to FIG. 3, those blocks which have the same numbers as that of FIG. 1, are equivalent and thus do not necessitate any additional explanation or description.

In order to carry out the storage of the call forwarding terminate interval code, a time memory 60 is provided which received the outputs of the digit detector 26. The control logic and timing circuit 50' includes the same circuitry as circuit 50 with the exception that it controls the writing in of the stored telephone number into the telephone memory 47 and thereafter the writing in of the time code into memory 60.

A clock generator 62 is provided with is enabled and reset by the control logic and timing circuitry 50' and which feeds the output thereof to comparator 61 which also receives the output of the time memory 60. Upon a favorable comparison of the clock generator with the output of the time memory, the comparator 61 issues a signal to the call forward terminate code generator 44 which enables same to place the call forwarding terminate code on the line via the dialer 42 and line amplifier 40.

The operation of this circuit in accordance with the method of the invention and in conjunction with that of FIG. 1, can be seen from the flow chart of FIG. 4 which branches off from the flow chart of FIG. 2 at step 103 described hereinbefore.

In this mode, the ring detector 22' is the same as detector 22 except that it detects the second ring which occurs if the telephone line is not in a call forward mode. If the phone does not ring twice in step 500, then the device is returned to state A in FIG. 2. If the phone does ring twice as detected by ring detector 22', in step 501 the line is seized and an acknowledgment code is sent to line 20 whereupon the device is ready to receive the identification code if the caller wants to initiate a remote call forwarding programming of the device. If the identification code is not valid at step 502, then the ring generator 30 generates a limited number of rings until the answering machine TAM detects the call, whereupon the pick-up detector 33 will release the line in step 504 and return the device to state A. If on the other hand the identification code is valid in step 502, an acknowledgment tone is sent on line 20 and the device awaits the receipt of the call forwarding telephone number to be stored in step 601. In step 602 an acknowledgment tone is sent out along the line and awaits receipt of the interval time code for the time memory 60. If the user hangs up within a reasonable time as detected in step 603 and if the number for the call forwarding telephone number and the time code for the call forwarding time interval are proper as tested in step 604, a dial tone is detected in step 605 and the call forward initiate sequence is implemented. If not, then in step 608 the line is released and the device is returned to state A.

Upon the initiation of call forwarding, the device remains in the loop around step 606 until the time entered into the time memory 60 elapses as indicated by comparator 61. At that point, the device advances to step 607 wherein the call forward terminate code is dialed and placed on the line, the device releases the line in step 608 and the device is returned to state A.

While the circuits shown in FIGS. 1 and 3 have the telephone answering machine TAM disposed outside the device, the device being an add-on to the telephone answering machine, it is understood that in a preferred embodiment of the invention the telephone answering machine and device can be within a single unit. In this case, the device according to the present invention can utilize the telephone line seize circuitry in the telephone answering machine output line amplifier instead of that shown in FIGS. 1 and 3 and can be interfaced with the telephone answering machine control logic by means of the control logic and timing circuitry 50 so as to obviate the need for an additional pick-up detector which is already in the telephone answering machine control logic circuitry.

It should also be clear that a preferred embodiment of the present invention as shown in FIGS. 1 and 3 and the flow chart therefor as shown in FIGS. 2 and 4, can be achieved by use of a microprocessor suitably microprogrammed to carry out these functions in the sequence noted in the flow charts of FIGS. 2 and 4. While a microprocessor is preferred means by which the device according to the present invention is constructed, FIGS. 5-12 set forth means for performing each of the functions, constructed out of discrete circuit elements and integrated circuit devices.

Figure 5:
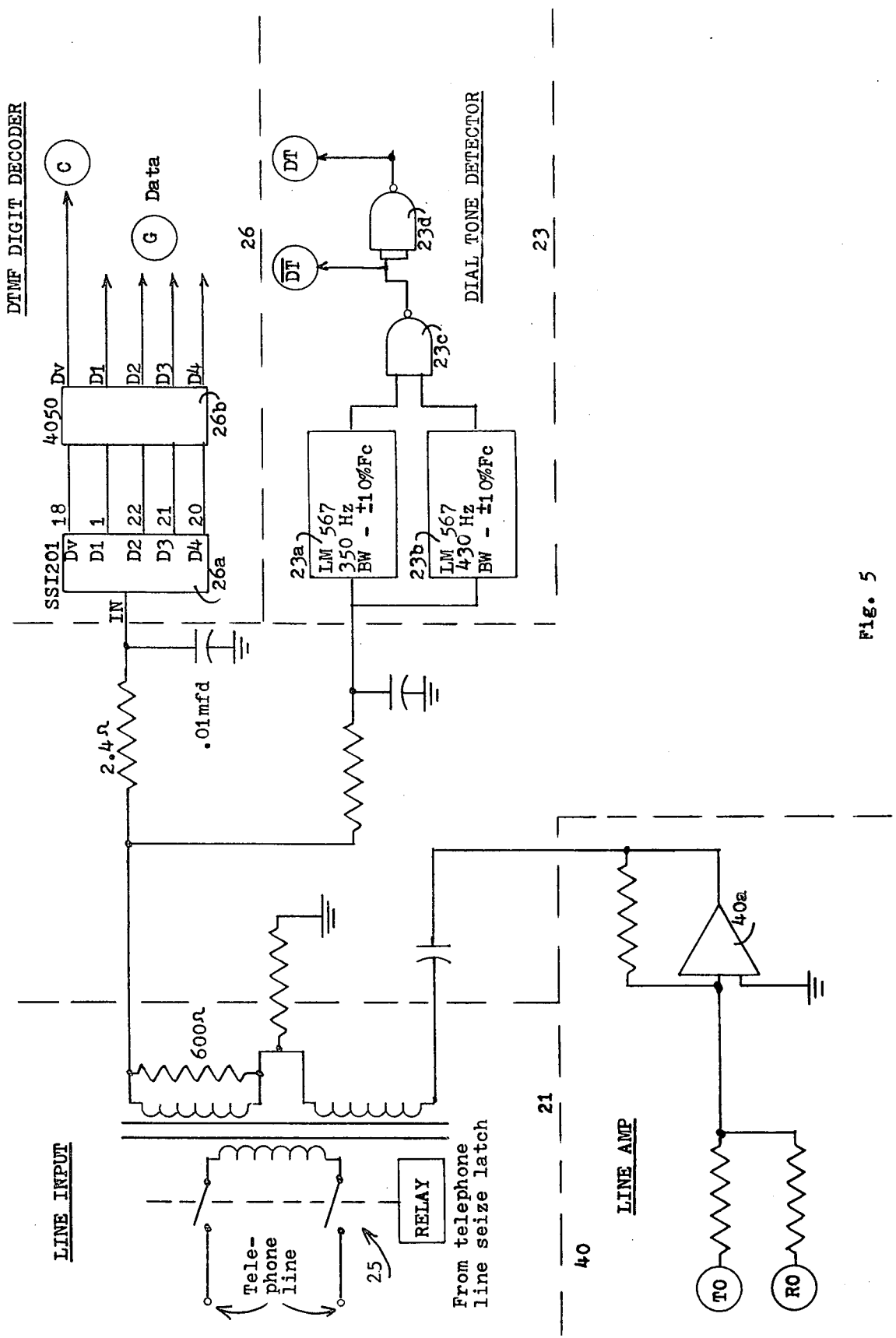
FIGS. 5–12 are schematics of the circuitry for carrying out the system of FIGS. 1 and 3.

FIG. 5 illustrates the input connection 21 and the output connection 40 shown in FIGS. 1 and 3. The telephone line input is connected to the telephone line 20 via a relay connection of relay 32 driven by the telephone line seize latch 25 and is input into the device by a transformer such as a T4220 Microtram transformer conventionally wired as shown. The output telephone line amplifier 40 comprises a conventionally wired operational amplifier 40a with the tone output signal from oscillator 41 and the ringing output from dialer 42 being fed into the summing input of the amplifier 40a.

Also shown in FIG. 5 is the detector and decoder circuitry 23 and 26 of FIG. 1. The DTMF digit decoder 26 comprises an SSI201 decoder 26a followed by a 4050 buffer 26b which generates digit data signal G and signal C indicating a valid telephone number has been decoded. The dial tone detector 23 comprises two programmable frequency decoder devices 23a and 23b, in this case each is an LM567, one set to detect frequencies at 350 Hz plus or minus 10% and the other set to decode frequencies at 430 Hz plus or minus 10%. In this manner the dial tone detector 23 is able to detect an input dial tone signal and generate signal DT and its inverse via gates 23c and 23d which indicate that a dial tone has been detected.

Figure 6:
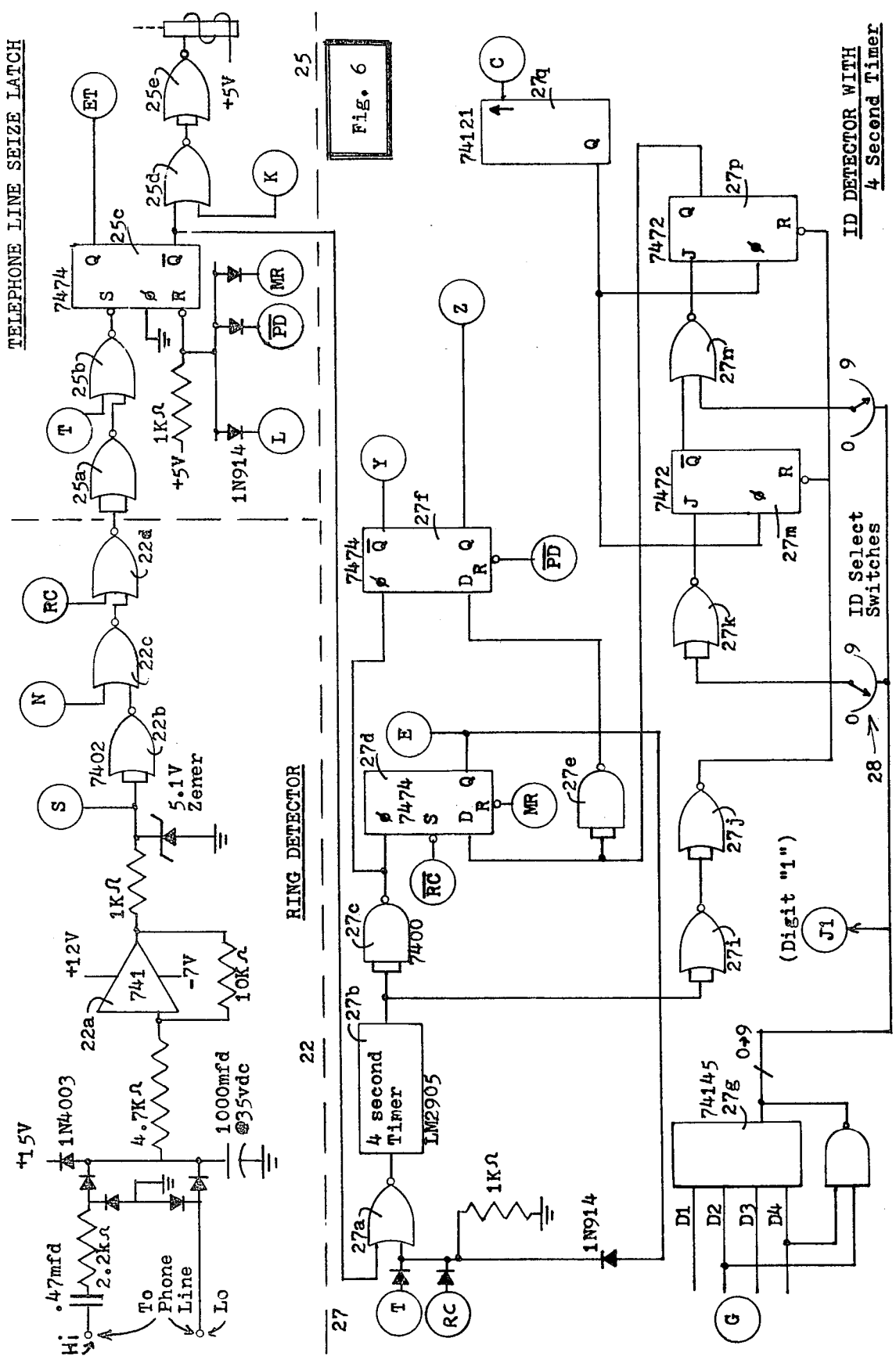

FIG. 6 shows the ring detector circuit 22 which receives its signal from the telephone line 20 and includes a LM741 operational amplifier 22a connected with the circuit elements shown in a conventional manner to produce a "one and only one" circuit. This circuit fires at 10 volts and does not fire again until reset by the input signal falling below two volts. The output signal S is high when the circuit fires thus indicating a ring detection. The signal is inverted through gate 22b and thereafter gated in gate 22c with signal N, generated by the circuitry in FIG. 8 and indicating that call forwarding is on and is thereafter gated with signal RC in gate 22d which is generated in FIG. 11 and is part of the security switch circuitry.

The output of gate 22d initiates the telephone line seize circuit 25 when the device is not in the call forward enabled mode. The output of the ring detector 22 via gate 25a is ORed with signal T in gate 25b. Signal T from FIG. 11, indicates that the number of rings has occurred within the predetermined timed interval and the telephone is to be seized when the device is in the call forwarding enabled mode. The latch 25c generates the ET signal which is sent to the acknowledgment tone oscillator 41 to generate a tone and is gated in gate 25d with signal K which is a disable line seize signal generated in FIG. 8 for carrying out the sequence to effect call forward initiation. The output of gate 25d is inverted by gate 25e and connected to the relay 32.

Figure 7:
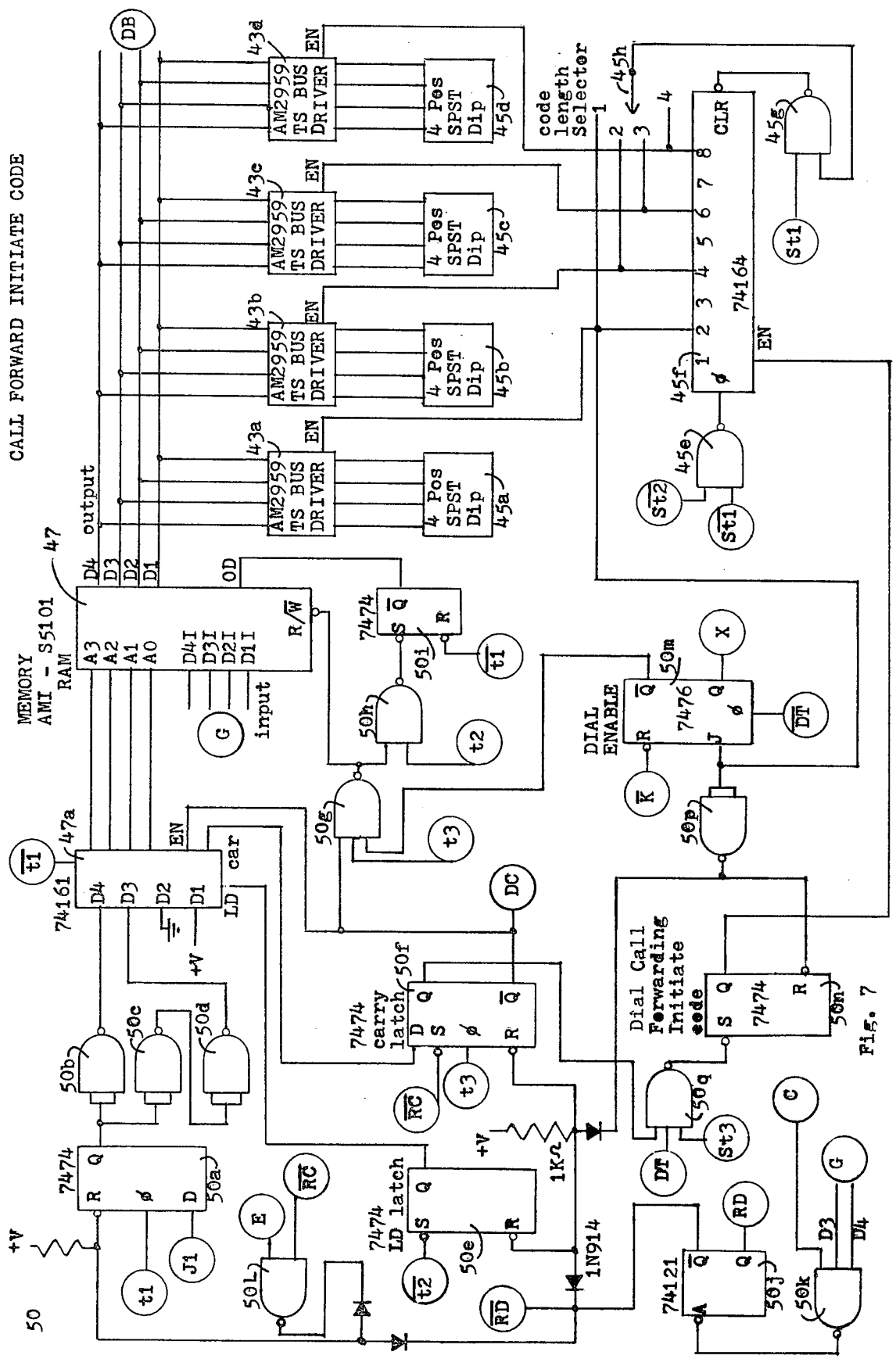

The detector 27 includes gate 27a receptive of signals T and RC and the Q output of latch 25c. The output is fed to four second timer 27b which gives the user four seconds in which to enter the identification code. The output thereof is fed to gate 27c as well as gate 27i followed by gate 27j for enabling and resetting flip-flops 27m and 27p. The BCD to decimal decoder 27g along with gate 27h receive data G from decoder 26 and converts these signals to digits 0-9 along ten lines which are then fed to switches 28 which are preset with the identification code. The circuitry shown in set up for a two digit identification code, although it is clear that any number of digits can be utilized. The receipt of the first identification code is latched into flip-flop 27m via gate 27k and the second code is enabled to be latched into flip-flop 27p by means of gate 27n. The receipt of the two digits of the identification code enables the output of flip-flop 27p to set flip-flop 27d which indicates that the identification code has been detected by sending out signal E or sets flip-flop 27f which indicates that no identification code has been detected by means of signals Y and Z. The enabling of the identification code detection is carried out by monostable 27q which receives signal C from the digit decoder 26, that indicates that a valid telephone number had been decoded. FIG. 7 illustrates some of the control logic 50 and the circuitry controlled thereby. Memory 47 as illustrated is a 1K×4 AMI S5101 random access memory which receives address data from address register 47a and the stored telephone number input data from the output of buffer 26b. The output thereof is connected to a data bus DB which is fed to the dialer shown in FIG. 9A and will be explained hereinafter.

Also connected to the data bus are the outputs of the call forward initiate code generator 43 which comprises in the circuit shown 4 AM 2959 tristate bus drivers 43a–43d fed by four position single pole single throw devices 45a–45d. This enables one to have a call forwarding initiate code of from 1 to 4 digits depending upon the particular telephone system in the region. This selection is effected by the timing circuitry 45e–45h which includes a code length selector switch 45h which feeds the input of a shift register 45f fed by timing signals through gates 45e and 45g generated by the timing circuitry of the system shown in FIG. 12 and which enables only the selected number of code digits to the output onto the data bus.

The memory control circuitry includes flip-flop 50a which detects the first received telephone number digit output from decoder 27g as being a "1" to indicate whether the number to be stored is a long distance number or a local number. The fact that it is a local or a long distance call, controls the location of the storage of the telephone number in memory 47 by controlling the address inputs to address register 47a through gates 50b–50d. Flip-flop 50a is reset via gate 50L at the initiation of receiving the call forwarding telephone number. Latch 50e is used to enable the loading of the address register and is also controlled by the signals indicating that the security requirements have been met in the terminate mode and in the initiate mode. Further timing of the memory and address register is carried out by the latch 50f and gate 50g. Gate 50h and output enable flip-flop 50i to control memory output onto the data bus DB.

The control circuitry also includes a reset capability which receives the output of the digit decoder 26b via gate 50k and which sets the flip-flop 50j if the crosshatch button on a Touch Tone phone has been depressed. This gives the user the option of resetting the memory control circuitry to begin the input of the number to be stored again.

When the user hangs up after completing the loading of the telephone number for call forwarding, a dial tone is received. It sets flip-flop 50n which enables the call forwarding initiate code circuit 45 through gate 50q. The flip-flop 50n is set by means of gate 50q when flip-flop 50f is set and the DT signal is high. The setting of flip-flop 50n enables shift register 45f to operate.

The first pulse signal from shift register 45f is used to set the dial enable flip-flop 50m which generates the X signal indicating that the dialing is enabled and this flip-flop also enables the action of gates 50g and 50h due to the connection to the input of gate 50g and at the same time reset flip-flops 50n, 50e and 50f via gate 50p.

Figure 8:
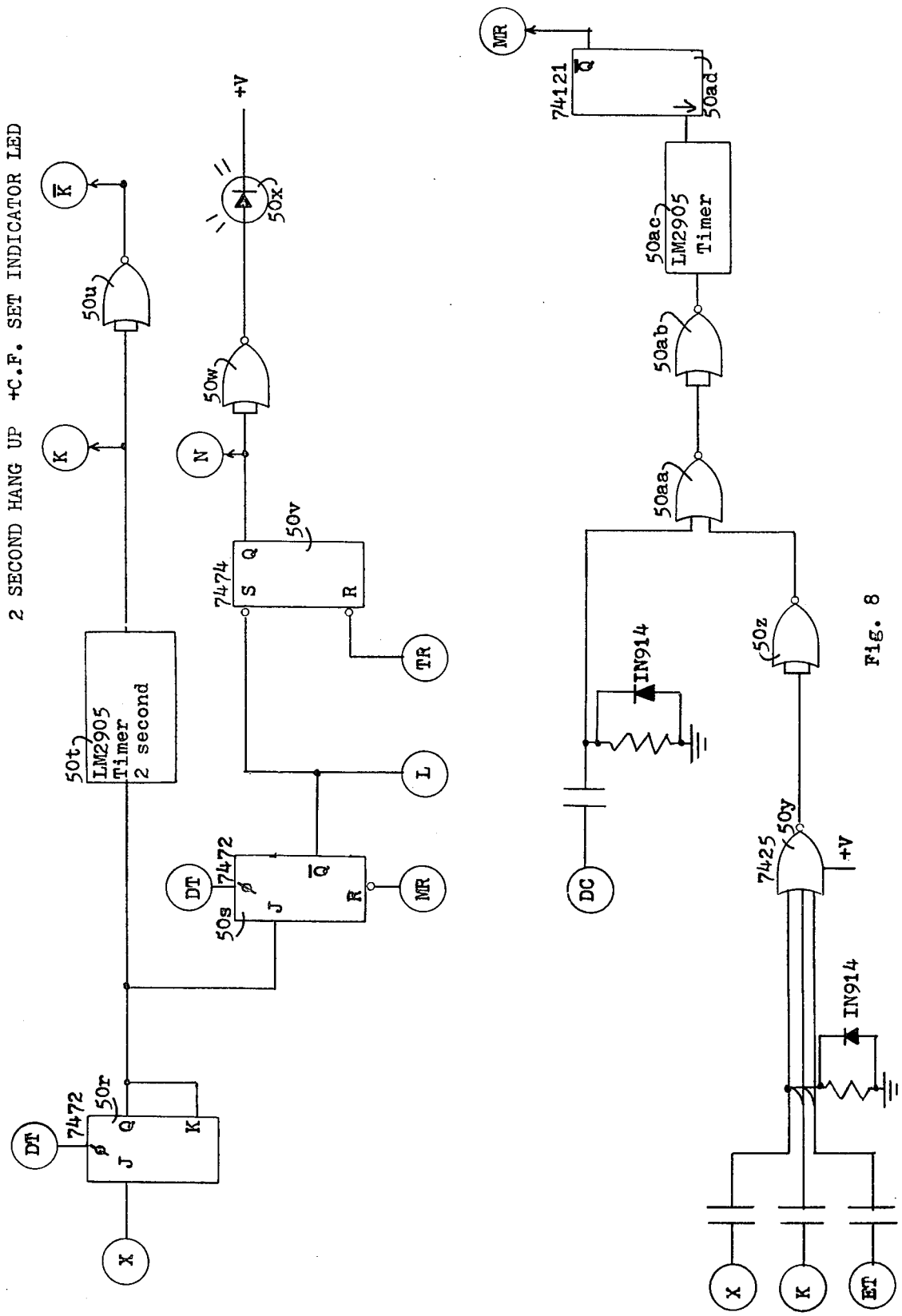

FIG. 8 shows further control logic and timing circuitry and in particular the two second hang-up circuitry which enables the call forwarding programming sequence to take place and a master reset timer. The two second hang-up circuit includes flip-flop 50r which turns on when the dial tone is received after the first dialing of the stored telephone is effected and the output of which sets the input to flip-flop 50s and initiates timer 50t. Timer 50t is an LM2905 timer circuit set up for two second timing. The output of timer 50t generates the K signal which is also inverted by gate 50u. The K signal causes the line seize latch to release the telephone line 20 for a two second hangup period and then reseize the line. When the second dial tone is received after the second dialing of the telephone number within the sequence of initiating call forwarding, it enables flip-flop 50s to be set which generates signal L which causes the telephone line to be released. It also sets 50v which generates signal N indicating that call forwarding is on and which optionally lights up a light emitting diode 50x via the buffer gate 50w.

The system also includes the fail safe master reset timer which acts to reset the entire device if there is a period of inactivity for approximately 30 seconds anywhere in the sequence. This prevents the device from failing and tying up the telephone line. The various signals are fed into the circuit and logically gated by gates 50y, 50z, 50aa and 50ab and fed into a 30 second timer 50ac whose output then feeds the setting input of a monostable 50ad whose output generates the MR signal which resets selected flip-flops in the device.

Figures 9A, 9B:
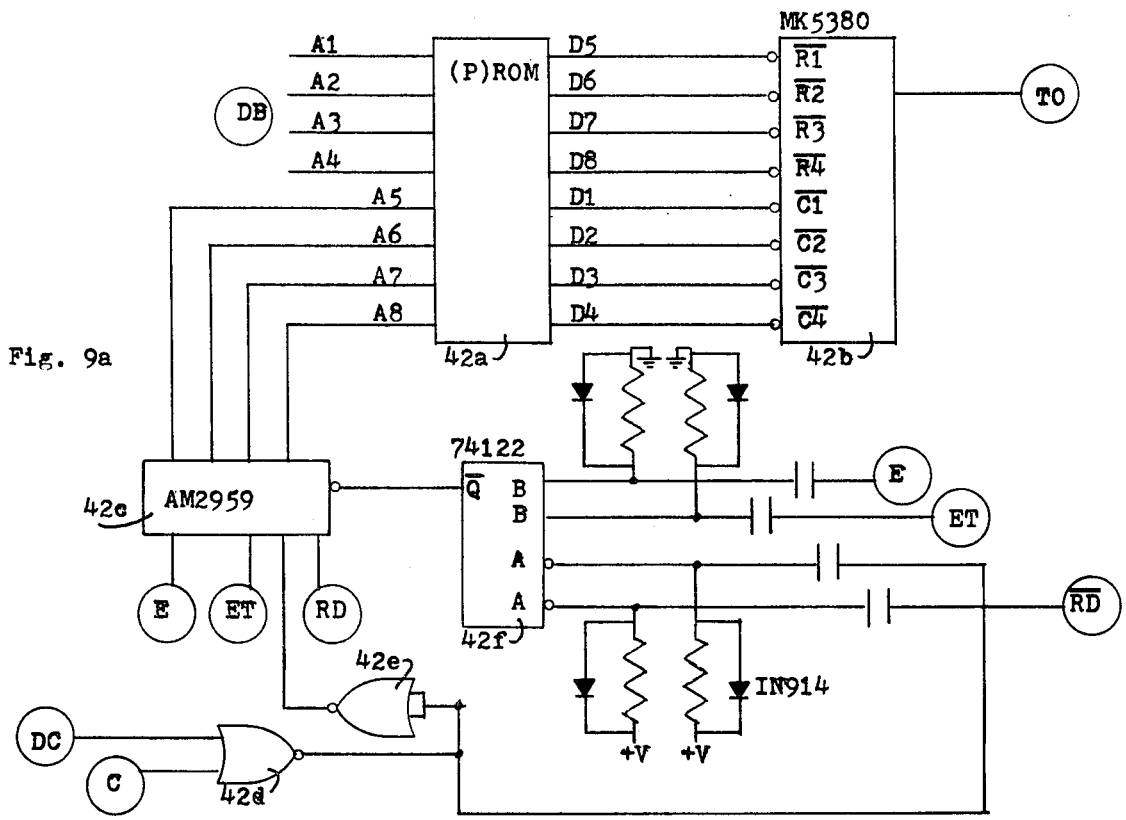

FIG. 9a shows the acknowledgement tone oscillator 41 and which is composed of PROM 42a, tristate bus driver 42c, pulse generator 42e and dialer 42 and FIG. 9b is a table of the coding of PROM 42a of FIG. 9a. The output of the data bus is fed into four inputs of PROM 42a and the other four inputs of the PROM are fed by a tristate bus driver 42c which receives the three signals E, ET and RD as well as the logical combination of signals DC and C which are OR'ed by gates 42d and 42e. The inputs to flip-flop circuit 42f and the discrete elements conventionally wired at the inputs thereof form a pulse generator for feeding the tristate bus driver 42c so as to apply a "beep" at the output of the chip dialer 42b. The PROM 42a is programmed to generate signal tones for acknowledgement signals and to generate the desired digit tones based upon the data bus signals feed therein.

Figure 10:
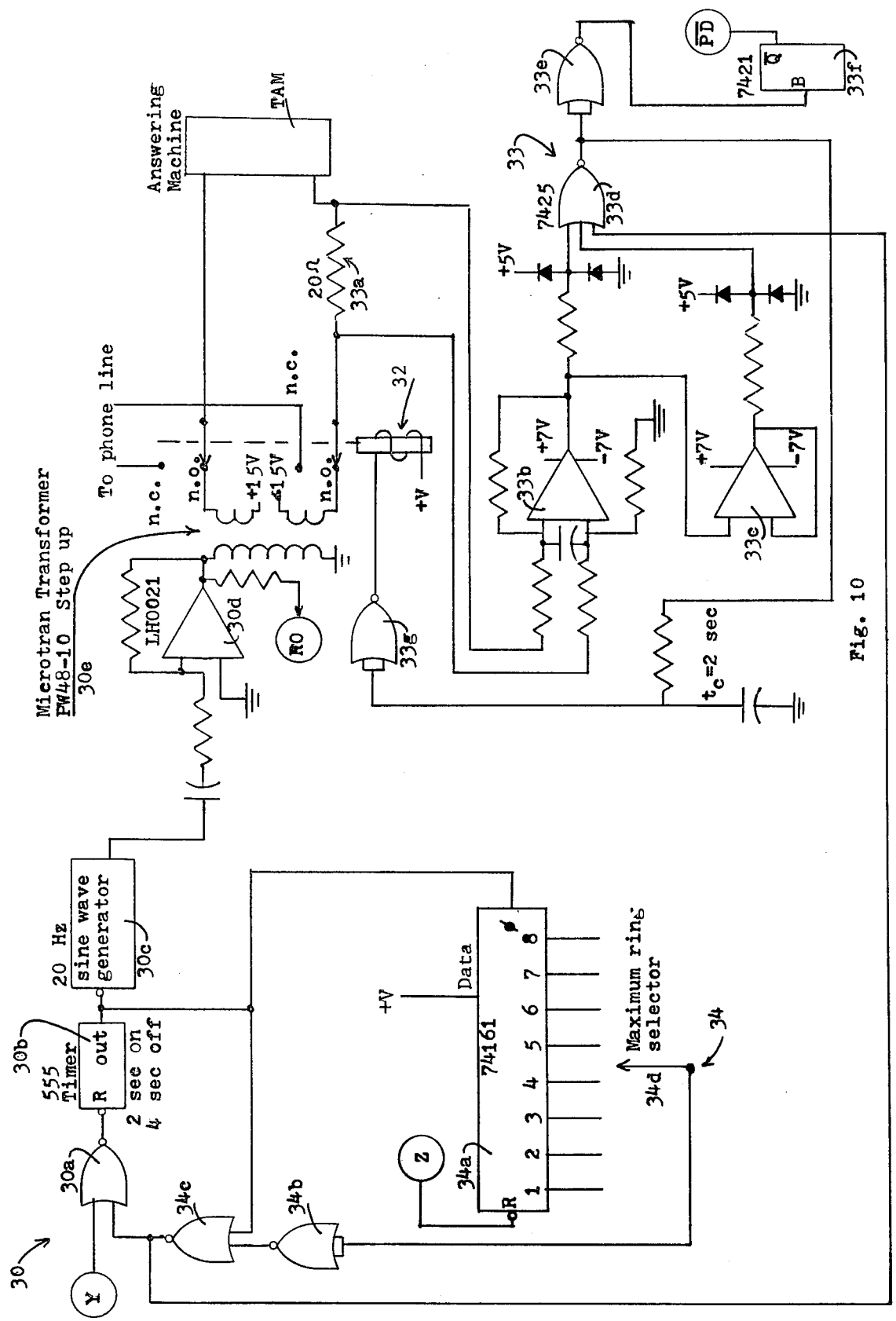

FIG. 10 illustrates the circuitry for elements 30–34 which act to ring the telephone or TAM when the device is not in the call forwarding mode and a valid identification code is not received. Gate 30a receives the signal Y indicating that no identification code has been detected and that an ordinary telephone call is being received. The output thereof is fed to a timer 30b which is set to be on for two seconds and off for four seconds and the output of that timer 30b which is set to be on for two seconds and off for four seconds and the output of that time 30b is fed to a 20 Hz sine wave generator 30c to create the ring signal. The timer is allowed to run through 1 to 8 cycles by means of the maximum ring selector circuitry 34 comprising shift register 34a, switch 34d selector switch 34d and gates 34b and 34c whose output is fed to the input of gate 30a. The timer 30b thus generates the desired number of rings based upon the setting of the selector switch 34d. The output of generator 30c is fed to operational amplifier 30d and is coupled to TAM via the transformer 30e. The RO output of the generator is fed to the telephone line 20 via line amp 40. The transformer 30e feeds the answering machine TAM as well as a pickup detect circuit 33 which includes d.c. current sensing resistor 33a, amplifier 33b connected for a differential input in a conventional manner, amplifier 33c and gates 33d and 33e which act to set flip-flop 33f.

The output of gate 33d is fed to gate 33g which acts to disable the relay driver 32 when a pickup is detected to switch the answering machine TAM to the telephone line in a conventional manner.

Figure 11:
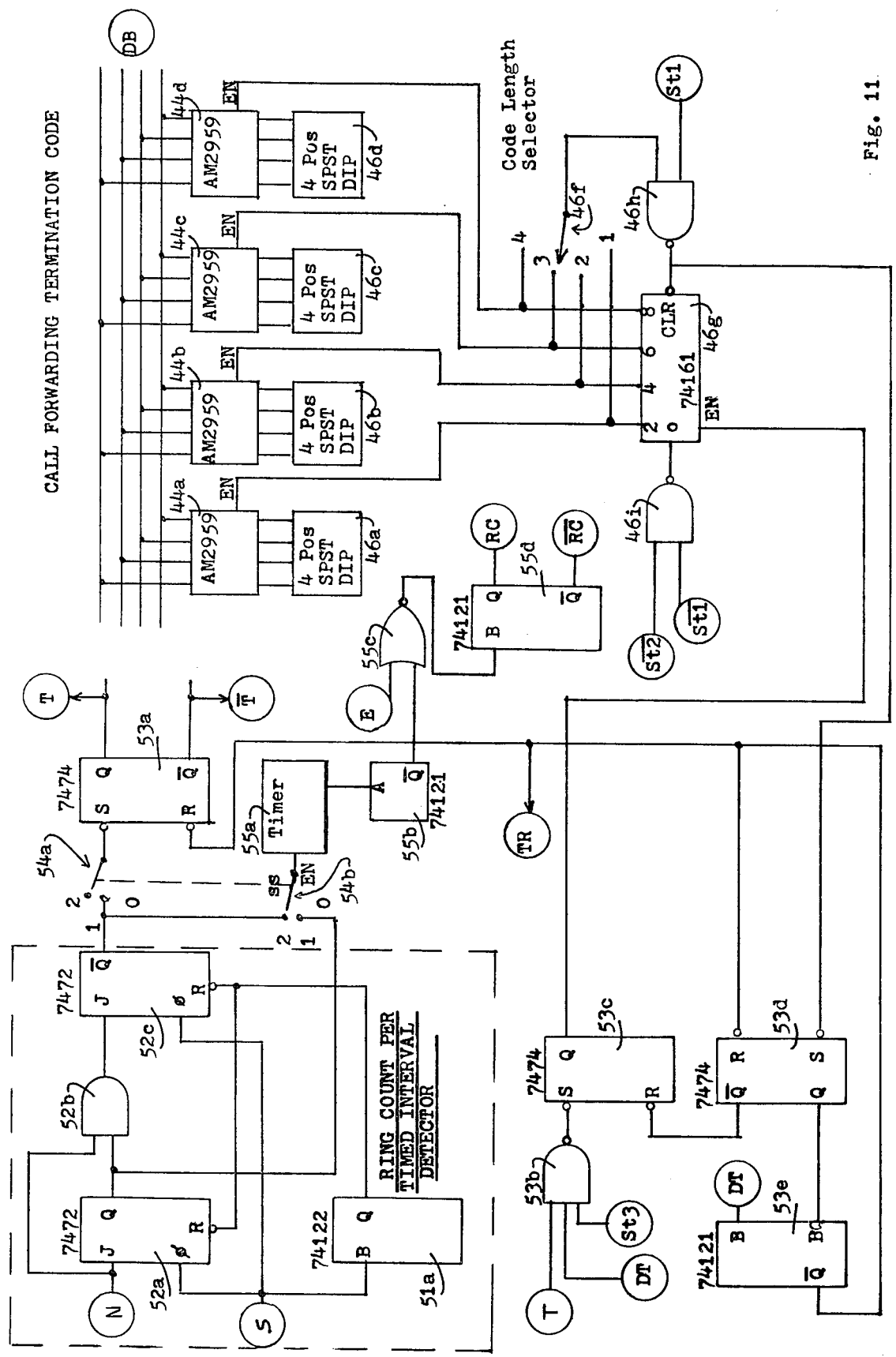

FIG. 11 illustrates the call forwarding terminate circuitry 44, 46 and 51–55.

The call forwarding terminate code generator 44 includes the tristate bus drivers 44a–44d which feed the data bus and the programmable switches 46a–46d each of which is a four position single pole single throw switch. Again, the circuitry is set up to receive anywhere from 1 to 4 digits of terminate code depending upon the telephone system and in order to carry this out the device includes the code length selector circuitry comprising switch 46f and logical elements 46g, 46h and 46i which are similar to that for the call forwarding initiate code length selector shown in FIG. 7.

The actual security switch 54 is in fact a ganged switch including portion 54a and 54b feeding flip-flop 53a and timer 55a respectively.

Ring count circuit 52 comprises flip-flop 52a and 52c as well as gate 52b and timer 51a. Preset timer 55 comprises timer element 55a and the circuitry operates as follows. The first detected ring sets flip-flop 52a which enables the setting of flip-flop 52c upon the second ring. When the security switch 54b is set to the "0" position, the actions of flip-flop 52a and 52c have no effect on timer 55a, however the output of flip-flop 52c is fed to the set input of flip-flop 53a which enables the call forwarding terminate code to be issued when signal T is produced.

When the security switch 54b is set to "1", the output of flip-flop 52a initiates timer 55a which triggers one shot 55b which has the output thereof fed to gate 55c and which is gated with signal E to trigger one shot 55d to produce the RC signal to reinitialize the call forwarding sequence for the telephone number stored in memory.

When switch 54b is set to position "2", the RC signal is not produced until the second ring effects the setting of flip-flop 52c. It should be noted that if the second ring is not received within the timing cycle defined by timer 51a, then flip-flops 52a and 52c are reset and the termination of call forwarding is not carried out.

Signal T generated at the output of gate 53a sets the line seize latch and is gated with the dial tone detect signal DT in gate 53b to set flip-flop 53c which enables the placing of the terminate code on the data bus. The timing for the sending of the terminate code over the data bus is thereafter defined by 46f, 46g, 46h, 46i. Monostable 53d and flip-flop 53e act to disable the terminate circuitry after the terminate code has been sent.

Figure 12:
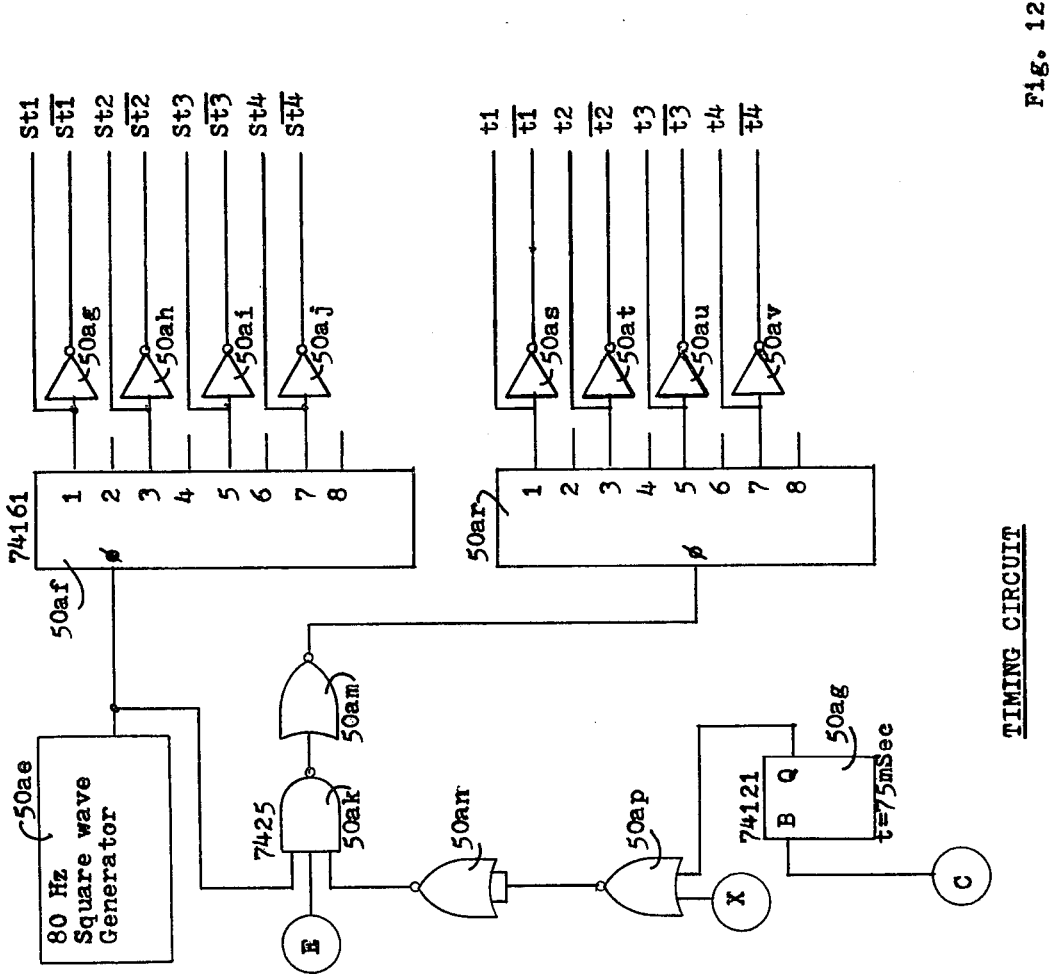

FIG. 12 illustrates the circuitry for generating the timing signals used throughout the device according to FIGS. 1-11. As can be seen, the 80 Hz square wave generator 50ae feeds the shift register 50af to generate ungated timing signals St1-St4 and their inverse by means of inverters 50ag, 50ah, 50ai and 50aj. The output of square wave generator 50ae is also used to generate gated timing signals t1-t4 and their inverse by means of gates 50ak, 50am, 50an and 50ap as well as a one shot 50aq. The output of 50am is fed to shift register 50ar to generate the timing pulses and utilizes inverters 50as, 50at, 50au and 50av.

The system timing for call forward initiating and terminating is now explained. Of the two sets of timing pulses, t1-t4 and St1-St4, t1-t4 are gated such that they are available only during the reception and decoding of telephone number digits and the dialing sequence for initiating call forwarding. St1-St4 are not gated and available at all times. t1, t2, t3, t4, St1, St2, St3, St4, are sequential time periods of equal duration. These time signals sequence the processes and determine the dialing output timing. The time period from $\overline{St2}-\overline{St1}$ determines the output pulse length. The time period from $\overline{St1}-\overline{St2}$ determines the time interval between pulses.

In the initiating mode, a ringing signal from the telephone company is detected in 22 generating signal S and sets the line seize latch 25. This causes signal ET to be generated and an acknowledgement tone to be generated also. The identification detector 27 is enabled allowing 4 seconds for the correct ID code to be received. If the correct ID code is not received, signals Y and Z are generated to enable the ring generator circuit 30. If the correct ID is received within the 4 second period, signal E is generated which generates an acknowledgement tone, resets the "1" detector latch 50a, and enables t1-t4. The first received telephone number digit is checked by "1" detector 50a. Depending on the result of the test the initial address for memory is generated by address register 47a. The first digit is stored in memory 47 and the address register load function is disabled. Proceeding digits are stored at consecutive memory locations. The last received digit generates a carry and sets the carry latch 50f. If a # (cross hatch) digit is detected at any time during the loading sequence, the address register is reloaded with the starting position and the loading process is restarted. The user hangs up while the device maintains its seize on the line and awaits dial tone. Upon its receipt, signals DT and $\overline{DT}$ are generated. The call forwarding initiate code is then dialed. After dialing, dial tone is detected from the telephone company again generating DT and $\overline{DT}$. Dialing of the stored number now occurs. The address register 47a is reloaded with the memory address of the first received digit. The output of memory 47 is placed on the data bus DB and fed to PROM 42a. This generates the correct 2-of-8 code for the dialer to generate appropriate tones. The output of the dialer is fed to the line amp 40 to be outputted on to the telephone line 20. All of the digits of the telephone number are generated this way. After the last digit is dialed, the carry latch 50f is set and two bursts of dial tone are detected by the dial tone detector. The 2 second hangup timer is enabled generating signal K and $\overline{K}$. K causes the line seize latch to release the telephone line and reseize it. A dial tone is then detected and the number is redialed. Upon completion of the second dialing, dial tone is again detected and the line released to terminate the processes. The call forward latch 50v is set and the LED 50x illuminated. The N signal generated by 50v sets the device for the call forward terminate mode.

In the terminate mode, ringing is detected by the ring detector circuit 22. The ring count per timed interval detector circuit 51, 52 is enabled starting timer 51a. If an additional ring is received before the timer times out, the call forwarding terminate process is initiated. If an additional ring is not detected, the ring count per timed interval detector is reset. The terminate process begins with the setting of 53a. This generates signal T and $\overline{T}$ which set the line seize latch 25 and enable the dialing of the terminate code. Upon detection of dial tone after dialing, the call forwarding latch 50v is reset and the LED is extinguished. The line seize latch is also released.

In the case of the security function, after the call forwarding termination is performed, timer 55b is set. If a correct ID code is received before the timer times out, the timer will be disabled by signal E. If a correct ID code is not received within the time period, RC and $\overline{RC}$ are generated which initialize the call forwarding initiate circuitry to the number stored in memory.

The other circuit elements shown herein are not discussed in any further detail are conventional in design or nature and thus need no further explanation.

It will be appreciated that the instant specification and claims are set forth by way of illustration and not limitation, and that various modifications and changes may be made without departing from the spirit and scope of the present invention.

What is claimed is:

1. A device for remotely controlling call forwarding for a given telephone line, the device comprising:
   input means connectable to the given telephone line for receiving input signals remotely applied to the line;
   output means connectable to the given telephone line for applying output signals thereto;
   means responsive to the receipt of a preselected identification code by the input means for storing a desired call forwarding telephone number received by the input means with said identification code and for sequentially applying a call forwarding initiate code and thereafter said stored number to the output means; and
   means responsive to signals received by the input means for applying a call forwarding terminate code to the output means.

2. The device according to claim 1, wherein the means for applying the call forwarding terminate code includes means responsive to the receipt of two calls within a preselected time interval for producing the call forwarding terminate code.

3. The device according to claim 2, further comprising means responsive to the absence of the receipt of said identification code within a preselected time period following the production of the call forwarding terminate code for sequentially applying the call forwarding initiate code and thereafter the last stored telephone number to the output means.

4. The device according to claim 2, wherein the means responsive to the receipt of the two calls comprises a counter receptive of the ring signals and timing means for disenabling the counting of the counter after said preselected time interval.

5. The device according to claim 1, wherein the means for applying the call forwarding terminate code includes means responsive to each call for producing the call forwarding terminate code and means responsive to the absence of the receipt of said identification code within a preselected time period following the production of the call forwarding terminate code for sequentially applying the call forwarding initiate code and thereafter the last stored telephone number to the output means.

6. The device according to claim 1, wherein the means for applying the call forwarding terminate code comprises means for storing a call forwarding time interval code following the identification code corresponding to a desired time interval and timing means for producing the call forwarding terminate code upon the expiration of the desired time interval.

7. The device according to claim 1, wherein the means for sequentially applying the call forwarding initiate code and thereafter said stored number comprises means for terminininating the call to the stored number prior to the ringing thereof and means for immediately repeating the sequential application of the call forwarding initiate code and stored number.

8. A device for remotely programming call forwarding for a given telephone line, the device comprising:
   input means connectable to the given telephone line for receiving input signals remotely applied to the line;
   output means connectable to the given telephone line for applying output signals thereto; and
   means responsive to the receipt of a preselected identification code by the input means for storing a desired call forwarding telephone number received by the input means with said identification code and for sequentially applying a call forwarding initiate code and thereafter said stored number to the output means,
   wherein the means for sequentially supplying the call forwarding initiate code and thereafter said stored number comprises means for terminating the call to the stored number prior to the ringing thereof and means for immediately repeating the sequential application of the call forwarding initiate code and stored number.

9. A device for remotely terminating call forwarding for a given telephone line, the device comprising:
   input means connectable to the given telephone line for receiving input signals remotely applied to the line;
   output means connectable to the given telephone line for applying output signals thereto; and
   means responsive to the receipt of signals for applying a call forwarding terminate code to the output means and including means responsive to the receipt of at least two calls within a preselected time interval for producing the call forwarding terminate code.

10. The device according to claim 9, wherein the means responsive to the receipt of at least two calls comprises a counter receptive of ring signals and timing means for disenabling the counting of the counter after said preselected time interval.

11. A device for remotely terminating call forwarding for a given telephone line, the device comprising:
   input means connectable to the given telephone line for receiving input signals remotely applied to the line;
   output means connectable to the given telephone line for applying output signals thereto; and
   means responsive to the receipt of signals for applying a call forwarding terminate code to the output means and comprising means for storing a received call forwarding time interval code corresponding to a desired time interval and timing means for producing the call forwarding terminate code upon the expiration of the desired time interval.

12. In combination: a device for remotely controlling call forwarding for a given telephone line, comprising input means connectable to the given telephone line for receiving input signals remotely applied to the line, output means connectable to the given telephone line for applying output signals thereto, means responsive to the receipt of a preselected identification code by the input means for storing a desired call forwarding telephone number received by the input means with said identification code and for sequentially applying a call forwarding initiate code and thereafter said stored number to the output means, means responsive to the receipt of signals by the input means following said identification code for applying a call forwarding terminate code to the output means, a telephone answering machine, a switching means for connecting the signals from the telephone line to the telephone answering machine prior to the production of the first call forwarding initiate code and after the production of a call forwarding terminate code.

13. The combination according to claim 12, wherein the means for applying the call forwarding terminate code includes means responsive to the receipt of two calls within a preselected time interval for producing the call forwarding terminate code.

14. The combination according to claim 13, further means responsive to the absence of the receipt of said identification code within a preselected time period following the production of the call forwarding terminate code for sequentially applying the call forwarding initiate code and thereafter the last stored telephone number to the output means.

15. The combination according to claim 13, wherein the means responsive to the receipt of two calls comprises a counter receptive of ring signals and timing means for disenabling the counting of the counter after said preselected time interval.

16. The combination according to claim 12, wherein the means for applying the call forwarding terminate code includes means responsive to each call for producing the call forwarding terminate code and means responsive to the absence of the receipt of said identification code within a preselected time period following the production of the call forwarding terminate code for sequentially applying the call forwarding initiate code and thereafter the last stored telephone number to the output means.

17. The combination according to claim 12, wherein the means for applying the call forwarding terminate code comprises means responsive to the receipt by the input means of the identification code for storing a call forwarding time interval code following the identification code and corresponding to a desired time interval and timing means for producing the call forwarding terminate code upon the expiration of the desired time interval.

18. The combination according to claim 12, wherein the means for sequentially applying the call forwarding initiate code and thereafter said stored number comprises means for terminating the call to the stored number prior to the ringing thereof and means for immediately repeating the sequential application of the call forwarding initiate code and stored number.

19. A method for remotely programming call forwarding for a given telephone line, comprising the steps of:
   detecting the receipt of a remotely transmitted identification code at the given telephone line;
   storing a desired call forwarding telephone number remotely transmitted after the identification code; and
   seizing the given telephone line and applying a call forwarding initiate code thereto followed by the stored telephone number by sequentially applying the call forwarding intitiate code and then the stored number, terminating the call to the stored number before the ringing thereof and immediately repeating the sequential application of the initiate code and stored number.

20. A method for remotely controlling call forwarding for a given telephone line, comprising the steps of:
   a. detecting the receipt of a remotely transmitted identification code at the given telephone line;
   b. storing a desired call forwarding telephone number remotely transmitted after the identification code;
   c. seizing the given telephone line and applying a call forwarding initiate code thereto followed by the stored telephone number;
   d. detecting the receipt of a remotely initiated signal after the identification code at the given telephone line; and
   e. seizing the given line upon a favorable detection and applying a call forwarding terminate code.

21. The method according to claim 20, wherein the step of applying the call forwarding initiate code and stored telephone number comprises sequentially applying the call forwarding initiate code and then the stored number, terminating the call to the stored number before the ringing thereof and repeating the sequential application of the initiate code and stored number.

22. The method according to claim 20, wherein the step (d) comprises detecting at least two calls within a preselected time interval.

23. The method according to claim 22, further comprising the step of detecting the presence or absence of the identification code within a preselected time period following the detection of said at least two calls and sequentially applying the call forwarding initiate code and already stored telephone number to the line in the absence of said identification code.

24. The method according to claim 20, further comprising the step of detecting the presence or absence of the identification code within a preselected time period following the detection of each call and sequentially applying the call forwarding initiate code and already stored telephone number to the line in the absence of said identification code.

25. The method according to claim 20, wherein step (d) comprises storing a call forward time interval code received after the identification code in step (a) and corresponding to a desired time interval and producing the call forwarding terminate code at the end of the desired time interval.

26. A method for remotely terminating call forwarding for a given telephone line, comprising the steps of:
   a. detecting the receipt of remotely initiated signals at the given telephone lines by detecting at least two calls within a preselected time interval; and
   b. seizing the given line and applying a call forwarding terminate code thereto.

27. A method for remotely terminating call forwarding for a given telephone line, comprising the steps of:
   a. detecting the receipt of remotely initiated signals at the given telephone lines; and
   b. seizing the given line and applying a call forwarding terminate code thereto;
   wherein step (a) comprises storing a call forward time interval code corresponding to a desired time interval and producing the call forwarding terminate code at the end of the desired time interval.

* * * * *